Dec. 23, 1924.
C. R. BROWN
1,520,558
COMBINED GRAIN HARVESTING AND THRASHING MACHINE
Filed Feb. 1, 1921   3 Sheets-Sheet 2
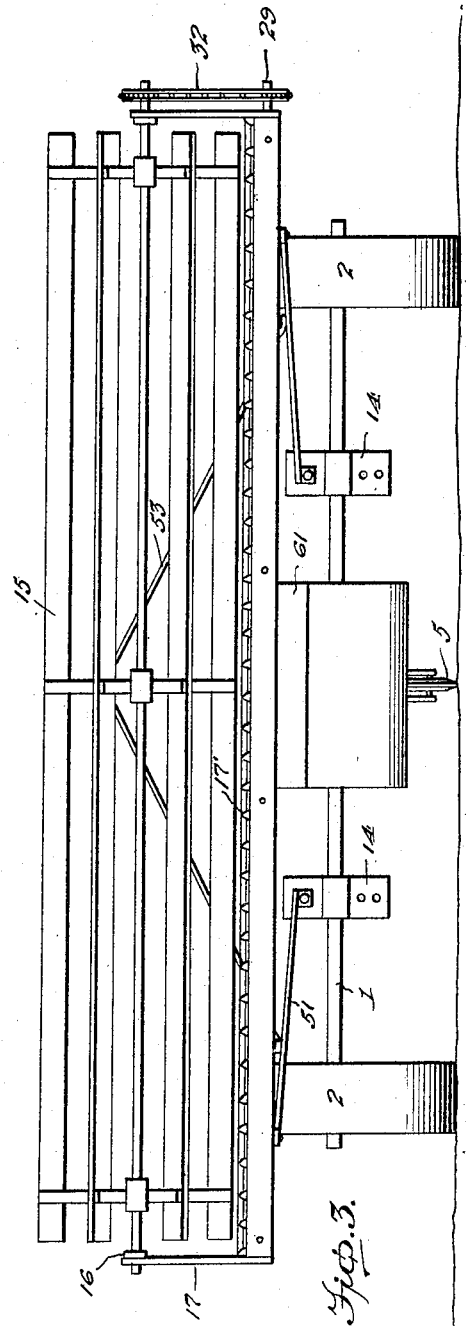
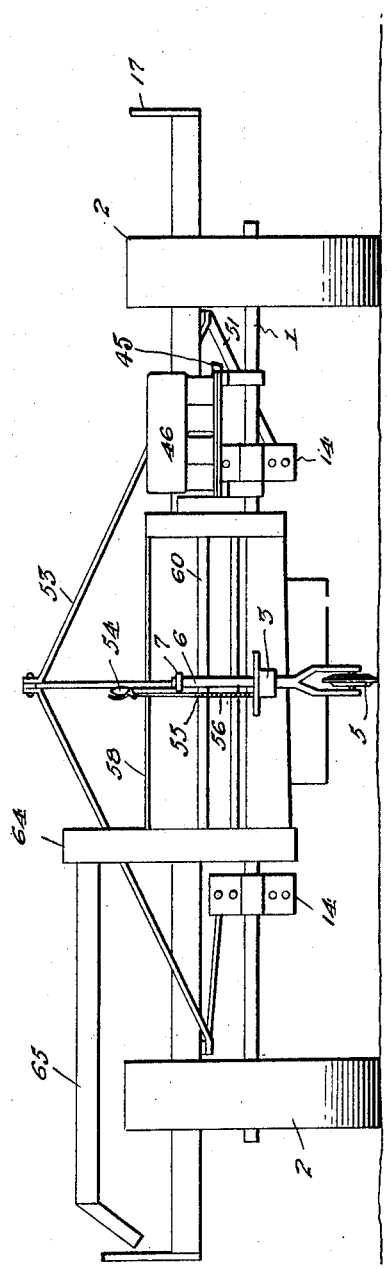

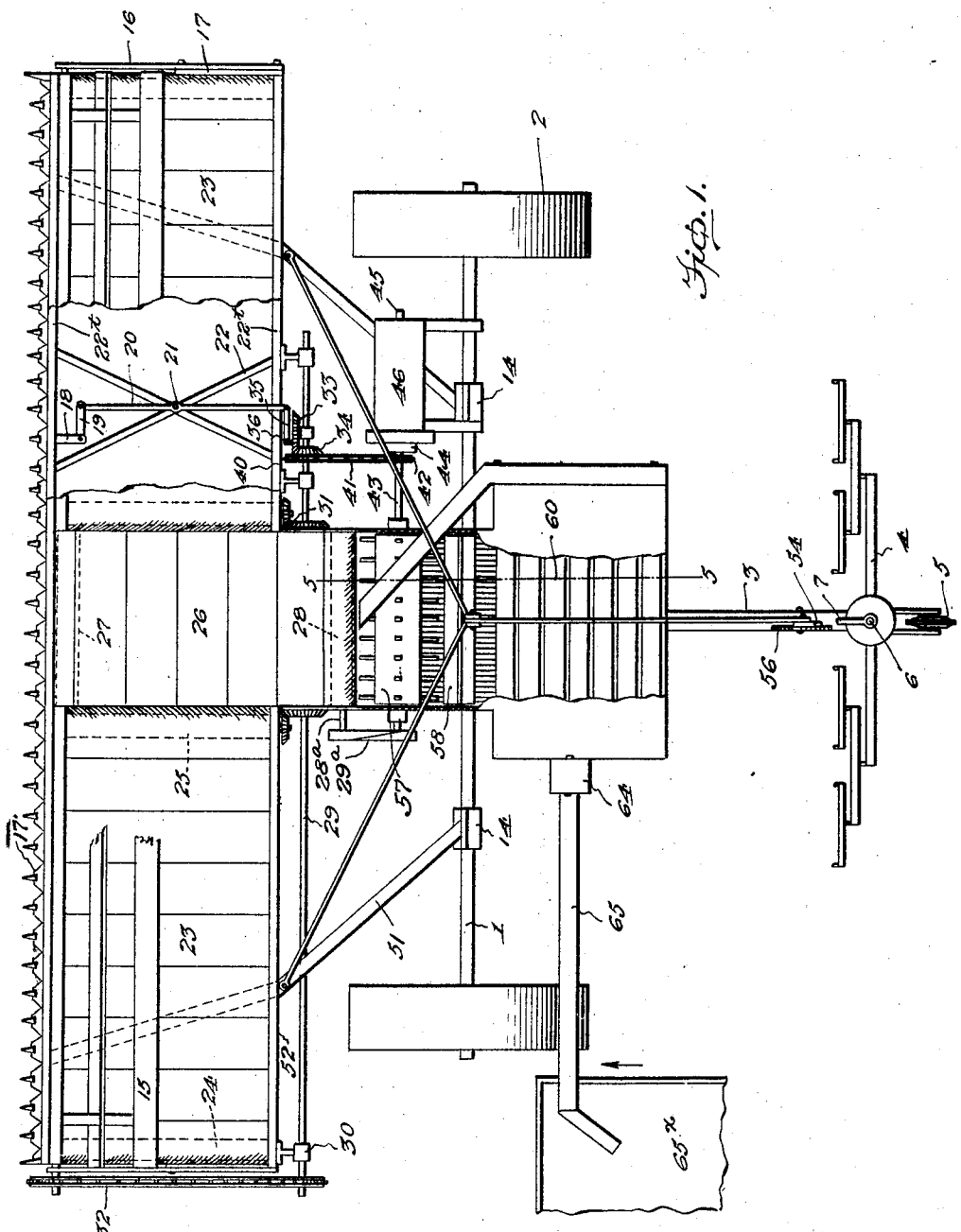

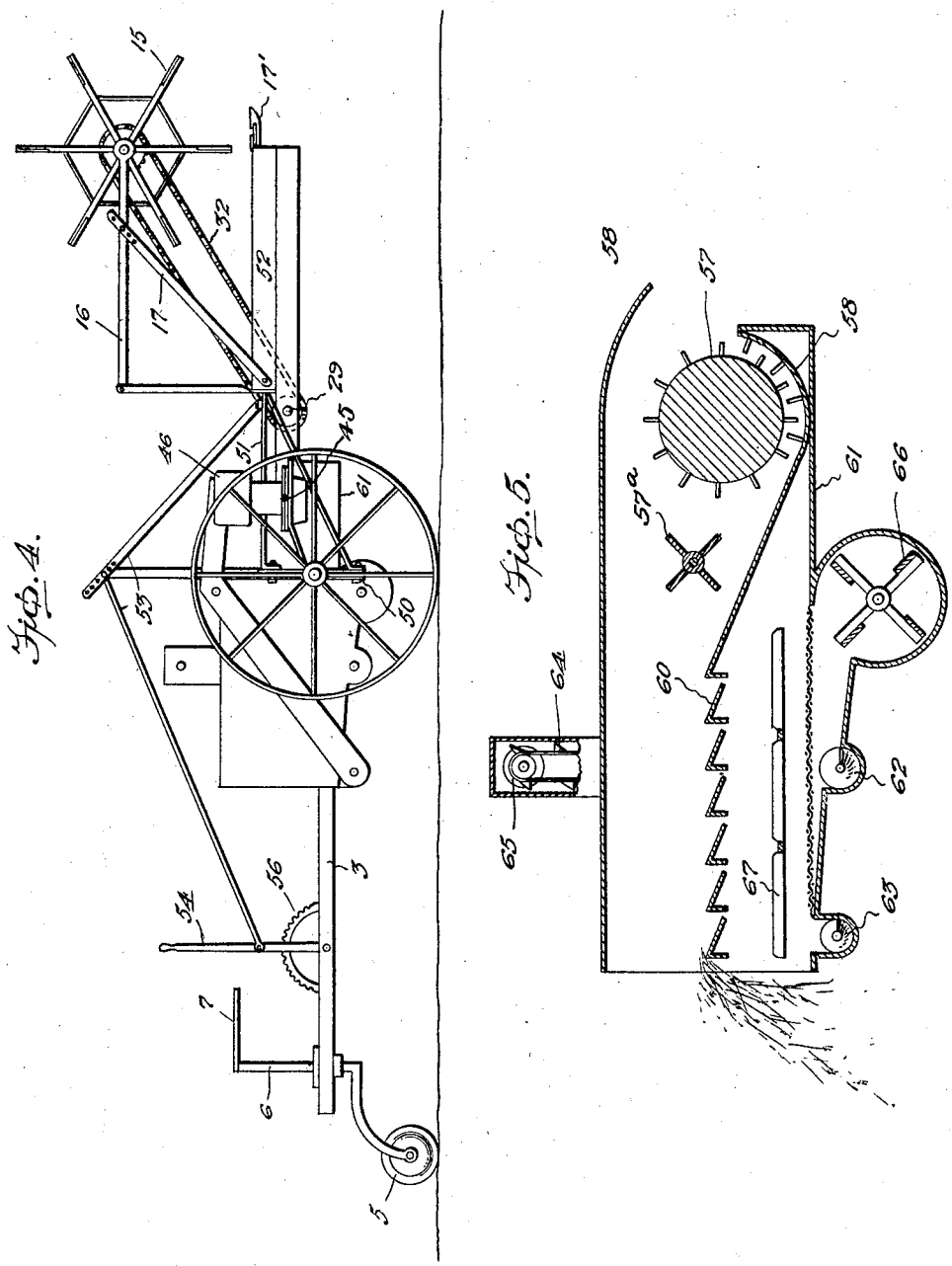

Patented Dec. 23, 1924.

1,520,558

UNITED STATES PATENT OFFICE.

CARL R. BROWN, OF STOCKTON, KANSAS.

COMBINED GRAIN HARVESTING AND THRASHING MACHINE.

Application filed February 1, 1921. Serial No. 441,638.

*To all whom it may concern:*

Be it known that CARL R. BROWN, a citizen of the United States, residing at Stockton, in the county of Rooks and State of Kansas, has invented new and useful Improvements in Combined Grain Harvesting and Thrashing Machines, of which the following is a specification.

My present invention pertains to combined grain harvesting and thrashing machines such as are designed to be moved over a grain bearing area and while in motion to cut standing grain and thresh the same.

The object of my invention is to provide a machine of the kind stated that is simple and compact in construction, efficient in operation, and susceptible of being easily and nicely adjusted to adapt the machine to the heights of the grain to be cut and threshed.

To the attainment of the foregoing the invention consists in the improvement as hereinafter described and definitely claimed.

In the accompanying drawings, hereby made a part hereof:—

Figure 1 is a plan view, partly broken away, illustrating the combined harvesting and thrashing machine of my invention and also illustrating a wagon body positioned to receive grain from the machine.

Figure 2 is a rear end elevation of the machine.

Figure 3 is a front end elevation of the machine.

Figure 4 is a view showing the machine in side elevation.

Figure 5 is a detail vertical section taken on the line 5—5 of Figure 1.

Similar numerals of reference designate corresponding parts in all of the views of the drawings.

Among other elements the machine includes a main axle 1 on which are ground wheels 2, and fixed to and extending rearwardly from the center of the axle 1 is a tongue 3 on the rear portion of which is a tree 4 which may be of the ordinary four horse type or of any other type compatible with the purpose of my invention. A steering wheel 5 is arranged at the extreme rear of the longitudinal center of the machine and is carried by a spindle 6, journaled in the rear portion of the tongue 3, and provided with a crank handle 7. At this point I would have distinctly understood that in lieu of the tree 4 and the other means illustrated for hitching the horses to the tongue 3, any appropriate draft equalizing means may be employed. Manifestly by virtue of the swinging steering wheel 5 the course of the machine may be readily changed when occasion demands. On the front axle 1 are brackets 14 that have to do with the support of the platform organization.

In addition to the elements named the machine includes a reel 15 which has for its function to deflect the upper portions of the grain stalks rearwardly so as to facilitate the cutting of the stalks by the means hereinafter described.

The said reel 15 is mounted in the manner illustrated in vertically adjustable levers 16 in combination with which I employ braces 17 so that the reel may be positioned at various heights, according to the heights of the grain to be harvested and threshed. At 17' is the sickle bar of the cutting mechanism of the machine which extends throughout the width thereof and is made up of the said sickle bar and the ordinary or any approved fingers associated with said bar. At 18 the said sickle bar is equipped with a rearwardly extending arm, and to said arm is connected one end of a link 19 the other end of which is connected to the forward arm of a lever 20 that is fulcrumed at 21 and is adapted to be rocked in a horizontal plane. The fulcrum or pintle 21 of the lever 20 is carried by crossed braces 22 interposed between and fixed to spaced transverse front and rear frame portions 22$^t$ of the machine as best shown in Figure 1. Manifestly the braces 22 afford a solid support for the fulcrum or pintle 21 so as to contribute to reliability of operation of the sickle bar of the cutting mechanism 17'. The machine also comprises transversely movable endless aprons 23, mounted on outer and inner rollers 24 and 25 and arranged in a horizontal plane slightly above a longitudinally movable endless apron 26 mounted on forward and rear rollers 27 and 28. The aprons 23 are designed to receive the cut grain, and to move the same inwardly and discharge it on the apron 26. The apron 26 is driven by a roller 28 fixed on a transverse shaft 28$^a$. The shaft 29 is journaled in bearings 30 arranged at intervals in the width of the machine, and the inner rollers of the transverse aprons 23 are connected with the said shaft 29 through the medium of the sets of gears 31. It will also be noted by comparison of the figures of the drawings that a driving connection 32 is provided between the shaft 29 and the reel 15, and that a driving connection is provided between the shaft 29 and the lever 20, the latter driving connection including an appropriately supported miter gear 33, a miter gear 34 fast on the shaft 29 and intermeshed with the miter gear 33, and a pitman 35 interposed between and connected to a wrist pin 36 off the center of the gear 33 and the rear arm of the lever 20. Manifestly the utilization of the transverse shaft 29 to transmit motion to the sickle bar 17' of the cutting mechanism, the reel, and the aprons 23 and 26 is an important feature of my invention inasmuch as it contributes to the simplicity and durability of the machine and promotes reliability in operation.

On the transverse shaft 29 is a sprocket gear 40 and on said sprocket gear 40 is a sprocket belt 41 that connects the sprocket gear 40 with a sprocket gear 42, fast on a shaft 43. The shaft 43 is clutched at 44, Figure 1, to the shaft 45 of the internal combustion engine 46. It is to be understood in this connection that the clutch is manually controlled so that at any time an attendant may disconnect the shaft 43 from the internal combustion engine. By virtue of this provision it is within the ability of an attendant of the machine when necessity arises to quickly stop the actuation of the actuating mechanism, the reel, and the aprons described.

The beforementioned shaft 28ª on which the roller 28 is fixed, is connected by a crossed belt 29ª, Figure 1, with the shaft 43 so that the apron 26 will be driven from said shaft 43.

Carried by the main axle 1 are brackets 14 with apertures at intervals in the length thereof. Connected adjustably to the said bracket 50 are the braces 51 of the platform 52. At 53 are adjustable braces through the medium of which the short portion of the platform 52 may be tilted upwardly or downwardly as required by the heights of the grain to be harvested. In this connection it will be observed that the braces 53 are connected with a hand adjusting lever 54 that is fulcrumed on the tongue 3 and is equipped with a detent 55 for cooperation with a segmental rack 56, fixed to the tongue 3 Figures 2 and 4.

The longitudinal apron 26 has for its function to feed cut grain to the cylinder 57, best shown in Figure 5 said cylinder 57 being appropriately arranged relatively to a concave or concaves 58. In this connection I would say that it is within the purview of my invention to construct the cylinder 57 and the concave 58 in any ordinary manner compatible with the purpose of the invention. It is also within the purview of my invention to employ in conjunction with the cylinder and concave, a rotary beater 57ª, a chaffer 67, a straw rack 60, the casing 61, the grain auger 62, the fan 66, the tailings auger 63, the grain elevator 64 and the grain auger 65 that extends from the upper end of the elevator 64. The said auger 65 is designed to convey grain to a wagon body 65ˣ that is moved in the relation shown in Figure 1 to the machine while the machine is in operation. The grain fan 66 and the chaffer 67 may also be of the well known construction in thrashing machines or of any other construction appropriate to my novel machine.

I, therefore, do not deem it necessary to illustrate said fan and chaffer in detail.

From the straw rack or racks 60 the threshed straw is delivered to the ground, and from this it follows that the straw may be easily turned under the ground to serve for fertilizing purposes. At this point I would direct attention to the fact that all of the working parts of the organized thrashing mechanism and grain and straw delivering mechanism are actuated from the shaft of the internal combustion engine 46 so that the sole province of the horses employed is to move the machine forward incident to the operation of the machine for the grain cutting, thrashing and delivering purposes.

Manifestly the main frame of my novel machine may be of the construction illustrated or of any other construction compatible with the purpose of my invention without affecting the invention as defined in my appended claims.

In the operation of the novel machine it will be understood that after the machine is put in operation all that is necessary for the attendant or attendants to do is to control the draft animals, and to manipulate the steering wheel 5 whenever it is necessary to change the course of the machine.

It will be apparent that my novel machine rests on the ground at three points—i. e., the two main wheels on the main axle and the steering wheel 5 at the rear end of the tongue 3.

The operator is positioned on the rear end of the tongue and straddles the lever of the steering wheel assembly; and it is the province of the driver to guide the machine and drive the horses.

Having described my invention, what I claim and desire to secure by Letters-Patent, is:—

1. A combined grain harvesting and thrashing machine comprising a wheel supported main frame, grain cutting mechanism, including a reciprocatory sickle bar having a rearwardly extending arm, a reel, a longitudinal central endless apron in rear of the cutting mechanism, transverse endless aprons in rear of the cutting mechanism and at opposite sides of and slightly above the longitudinal central apron, an organized thrashing mechanism arranged in rear of and adapted to receive cut grain from the longitudinal apron, straw delivering means in rear of and for cooperation with said thrashing mechanism, grain delivering means for cooperation with the thrashing mechanism, a motor carried by the main frame, driving connections intermediate of the motor and the working parts of the thrashing mechanism and the straw delivering means and the grain delivering means, a shaft extending crosswise of the machine, driving connections between the said shaft and the reel, and the transverse aprons, diagonal cross bars interposed between and fixed to spaced front and rear transverse portions of the frame, a lever fulcrumed at an intermediate point of its length on the crossed portions of said diagonal bars and having forward and rear arms, a link connection between the forward arm of said lever and the arm of the sickle bar, and means connecting said crosswise shaft and the rear arm of the lever and means connecting the motor with the said crosswise shaft and the longitudinal-central apron.

2. Grain harvesting means comprising a frame having spaced front and rear transverse portions, a cutting mechanism including a transversely reciprocating sickle bar, a rearwardly extending arm on said bar, diagonal cross bars interposed between and fixed to said transverse spaced portions of the frame, a lever fulcrumed at an intermediate point of its length on the crossed portions of the said diagonal bars and having forward and rear arms, a link connection between the forward arm of said lever and the arm of the sickle bar, and means connected with the rear arm of the lever to actuate the sickle bar.

In testimony whereof I affix my signature.

CARL R. BROWN.